(12) United States Patent
Sakata et al.

(10) Patent No.: US 10,457,318 B2
(45) Date of Patent: Oct. 29, 2019

(54) POWER STEERING ADJUSTMENT DEVICE

(71) Applicant: Mitsubishi Electric Corporation, Tokyo (JP)

(72) Inventors: Reiko Sakata, Tokyo (JP); Yoshimichi Umeki, Tokyo (JP); Tsutomu Matsubara, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 71 days.

(21) Appl. No.: 15/544,583

(22) PCT Filed: Jul. 15, 2015

(86) PCT No.: PCT/JP2015/070263
§ 371 (c)(1),
(2) Date: Jul. 19, 2017

(87) PCT Pub. No.: WO2017/009971
PCT Pub. Date: Jan. 19, 2017

(65) Prior Publication Data
US 2018/0273085 A1    Sep. 27, 2018

(51) Int. Cl.
*B62D 5/04* (2006.01)

(52) U.S. Cl.
CPC ................... *B62D 5/0457* (2013.01)

(58) Field of Classification Search
USPC .......................................................... 701/41
See application file for complete search history.

(56) References Cited

U.S. PATENT DOCUMENTS

| 9,290,201 B1* | 3/2016 | Lombrozo | B62D 15/025 |
| 2002/0087241 A1* | 7/2002 | Nakano | B62D 5/0457 |
| | | | 701/41 |
| 2002/0143449 A1 | 10/2002 | Yasuda | |
| 2013/0151076 A1* | 6/2013 | Lee | B62D 6/007 |
| | | | 701/41 |
| 2017/0001659 A1* | 1/2017 | Chiba | B62D 5/0472 |

FOREIGN PATENT DOCUMENTS

| JP | 2002-089352 A | 3/2002 |
| JP | 2002-293257 A | 10/2002 |
| JP | 2005-225430 A | 8/2005 |
| JP | 3785445 B2 | 6/2006 |
| JP | 2014-237376 A | 12/2014 |

OTHER PUBLICATIONS

International Search Report of PCT/JP2015/070263 dated Sep. 29, 2015.
Communication dated Jun. 21, 2019 from the State Intellectual Property Office of the P.R.C. in application No. 201580081691.5.

* cited by examiner

*Primary Examiner* — Tyler D Paige
(74) *Attorney, Agent, or Firm* — Sughrue Mion, PLLC; Richard C. Turner

(57) ABSTRACT

A steering control information calculation unit (2) calculates a graph of steering control information in accordance with steering control information acquired by a steering control information acquisition unit (1). A mark information input unit (3) acquires mark information input by an adjusting person. A mark information processing unit (4) sets a mark on the graph of the steering control information when the mark information input unit (3) acquires the mark information. An adjustment information display unit (6) displays the graph of the steering control information and the mark set by the mark information processing unit (4) to be superimposed.

9 Claims, 6 Drawing Sheets

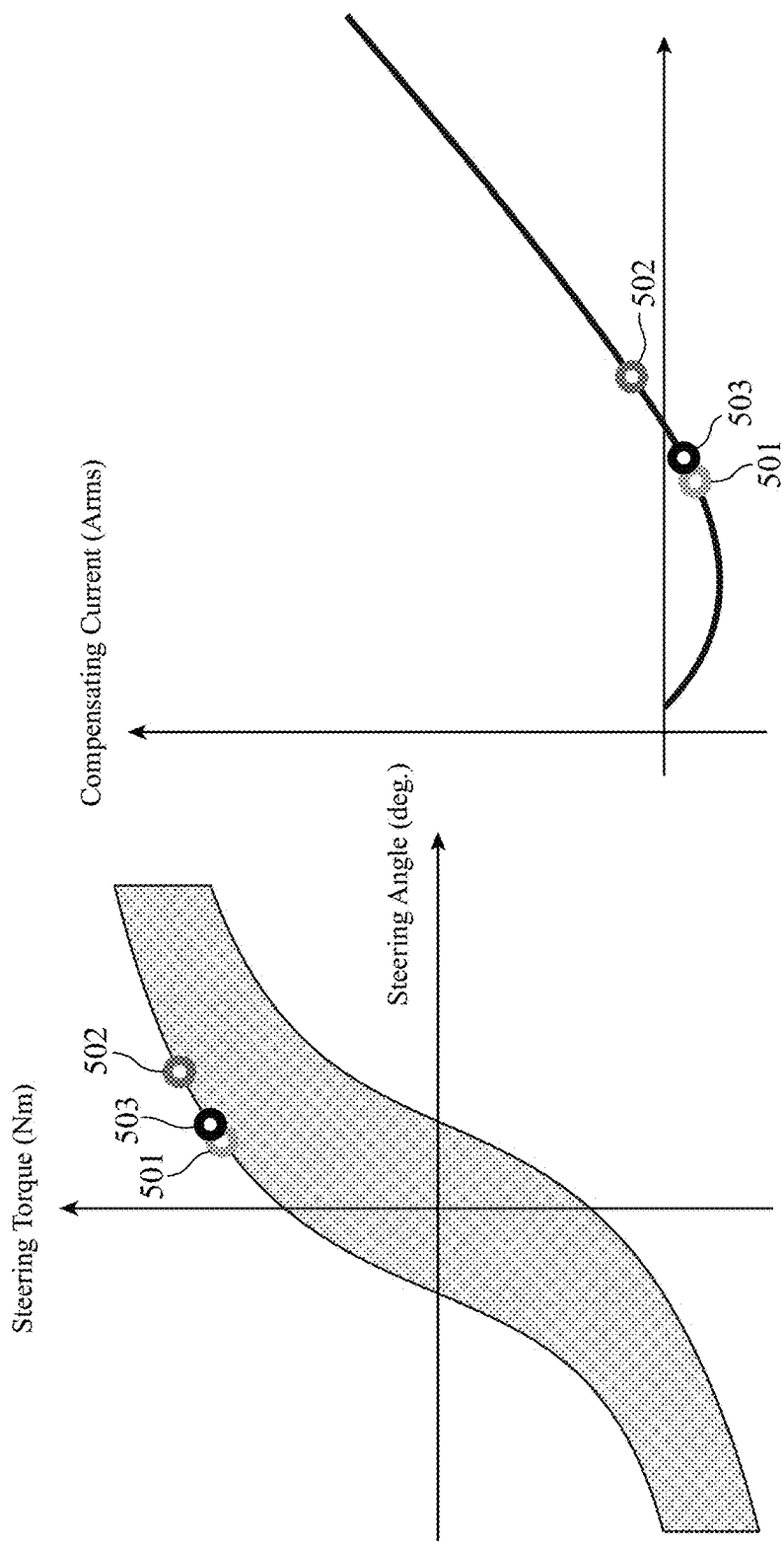

POWER STEERING ADJUSTMENT DEVICE

CROSS REFERENCE TO RELATED APPLICATIONS

This application is a National Stage of International Application No. PCT/JP2015/070263 filed Jul. 15, 2015, the contents of which are incorporated herein by reference in its entirety.

TECHNICAL FIELD

The present invention relates to a power steering adjustment device used for adjusting electric power steering (EPS).

BACKGROUND ART

In EPS in general, steering control is adjusted in a development process of a vehicle in accordance with development objects such that steering feeling of a steering wheel is optimized for a driver of the vehicle.

As a conventional technique of such an adjusting device, there is a technique in which a required editing amount is grasped as an intuitive or a sensuous amount by performing editing on a steering characteristic chart with visual inspection of the chart and the steering feeling is reconfigured to match development objects of a vehicle in a development process or individual characteristics of a driver (e.g. see Patent Literature 1).

In another technique, various steering feelings are obtained to match individual characteristics of a driver by editing and storing operation characteristics by clicking on or drawing a steering characteristic chart using a group of operation switches with visually checking steering characteristics displayed on a steering characteristics screen of a display device (e.g. see Patent Literature 2).

CITATION LIST

Patent Literature

Patent Literature 1: JP 2005-225430 A
Patent Literature 2: JP 2002-293257 A

SUMMARY OF INVENTION

Technical Problem

In a general procedure for adjusting steering feeling, the feeling of steering is checked with driving a vehicle, and after stopping the vehicle, the EPS is adjusted. Therefore, in a conventional technique, when steering is performed with driving a vehicle, there is a disadvantage that many workers are required such as a person who checks feeling and another person who records points at which the person notes something.

The invention is devised in order to solve such a disadvantage, and an object of the present invention is to provide a power steering adjustment device capable of easily and comfortably performing editing work without requiring many workers.

Solution to Problem

A power steering adjustment device according to the invention includes: a steering control information acquisition unit acquiring steering control information representing control information of assist power of steering; a steering control information calculation unit calculating a graph of steering control information in accordance with the steering control information acquired by the steering control information acquisition unit; a mark information input unit acquiring mark information representing a point being an adjustment candidate of the steering control information; a mark information processing unit setting a mark in accordance with the graph of the steering control information when the mark information input unit acquires the mark information; and an adjustment information display unit displaying the graph of the steering control information and the mark being set by the mark information processing unit.

Advantageous Effects of Invention

In a power steering adjustment device according to the present invention, when mark information representing a point set to be an adjustment candidate of steering control information is acquired, a mark is set in accordance with a graph of steering control information, and the graph of the steering control information and the set mark are displayed. As a result, editing work can be easily and comfortably performed without requiring many workers.

BRIEF DESCRIPTION OF DRAWINGS

FIGS. 5A and 5B are explanatory diagrams illustrating an example where mark information of the power steering adjustment device of the first embodiment of the present invention acquired earlier is displayed in the back while that acquired later is displayed in the front.

DESCRIPTION OF EMBODIMENTS

To describe the present invention in detail, some embodiments for carrying out the present invention will be described below with reference to the accompanying drawings.

First Embodiment

Figure 1:
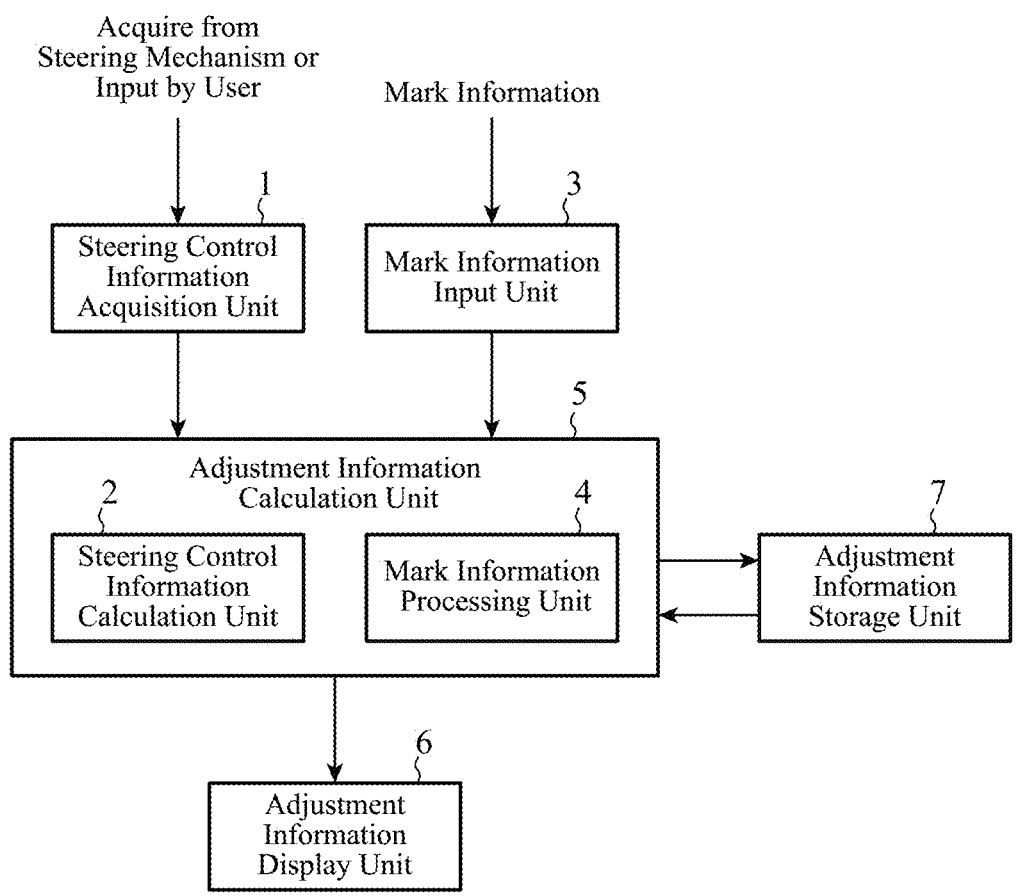
FIG. 1 is a configuration diagram illustrating a power steering adjustment device according to a first embodiment of the present invention.

FIG. 1 is a configuration diagram illustrating a power steering adjustment device of the present embodiment.

The power steering adjustment device according to the present embodiment includes a steering control information acquisition unit 1, a steering control information calculation unit 2, a mark information input unit 3, a mark information processing unit 4, an adjustment information display unit 6, and an adjustment information storage unit 7 as illustrated in FIG. 1.

The steering control information acquisition unit 1 is a processing unit which acquires steering control information representing control information of assist power of steering, such as a steering angle, a steering torque value, a vehicle speed, a motor compensating current amount, and reaction force from a road surface, in accordance with measurement of steering mechanism in a steering state or an input on a touch panel display device or other devices by an adjusting person. The steering control information calculation unit 2 is a processing unit which calculates a two-dimensional or three-dimensional graph from array data of two or three variables in the steering control information. As examples thereof, the following graphs are included: "steering angle and steering torque value", "reaction force received from road surface and motor compensating current", "steering torque and motor compensating current". "steering angle, steering torque value, and vehicle speed", "reaction force received from road surface, motor compensating current, and vehicle speed", and "steering toque, motor compensating current, and vehicle speed". The mark information input unit 3 is an input unit for inputting mark information when an adjusting person notes something while driving by using a device easy to use for input during driving such as switch input on a steering wheel, touch input on a touch panel display device, or speech recognition. In the case of speech recognition, input is performed with utterance such as "mark" or "here". The mark information input unit 3 is further configured to also accept deletion input of mark display as input of mark information. The mark information processing unit 4 calculates steering characteristic information or steering control information when mark information is acquired and specifies a place to display the mark information on each graph. The mark information processing unit 4 further processes the mark information in conjunction with information such as the vehicle speed when the mark is acquired, or how many times mark information is acquired since the start. The steering control information calculation unit 2 and the mark information processing unit 4 form an adjustment information calculation unit 5 which calculates adjustment information.

The adjustment information display unit 6 displays the adjustment information calculated by the adjustment information calculation unit 5, that is, the graph of the steering control information calculated by the steering control information calculation unit 2 and the mark information processed by the mark information processing unit 4 on the same screen to be superimposed to each other. The adjustment information storage unit 7 stores the adjustment information calculated by the adjustment information calculation unit 5, that is, the steering control information and the mark information.

Next, operations of the first embodiment configured as described above will be described.

Figure 2:
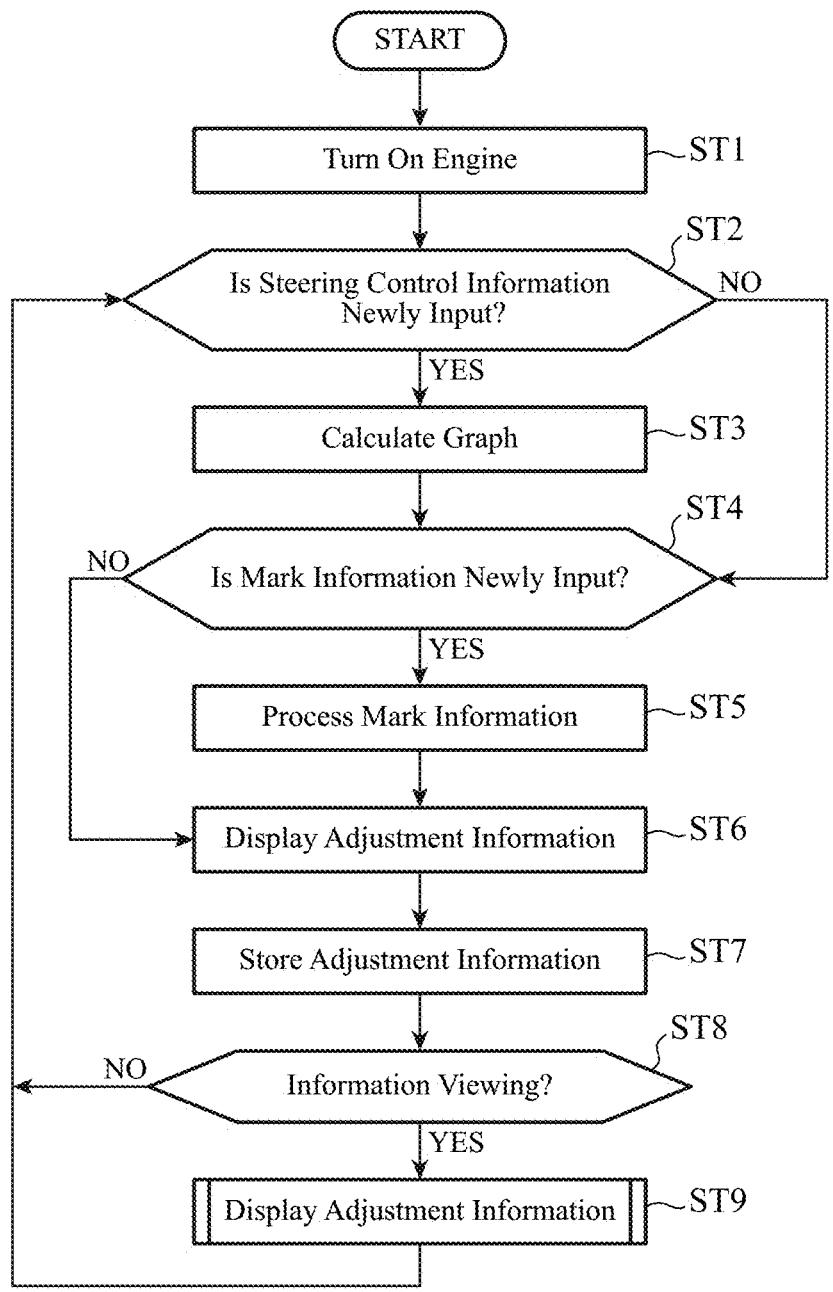
FIG. 2 is a flowchart illustrating operations of the power steering adjustment device according to the first embodiment of the present invention.
Figure 3:
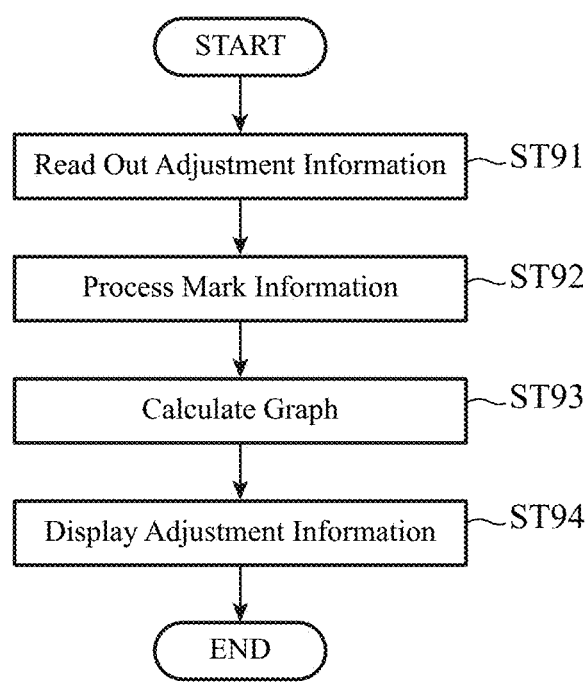
FIG. 3 is a flowchart illustrating operations of displaying adjustment information by the power steering adjustment device according to the first embodiment of the present invention.

FIGS. 2 and 3 are flowcharts illustrating operations of the power steering adjustment device of the first embodiment.

When the engine of a vehicle is turned on (step ST1), the adjustment information calculation unit 5 of the power steering adjustment device determines whether new steering control information is acquired by the steering control information acquisition unit 1 (step ST2). When new steering control information is acquired, the steering control information calculation unit 2 calculates a graph corresponding to the new steering control information and outputs it to the adjustment information display unit 6 and the adjustment information storage unit 7 (step ST3). Next, whether new mark information is input from the mark information input unit 3 is determined in the adjustment information calculation unit 5 (step ST4), and if new input exists, the mark information processing unit 4 processes the mark information and outputs it to the adjustment information display unit 6 and the adjustment information storage unit 7 (step ST5). As a result, the adjustment information display unit 6 displays, as adjustment information, the graph of the steering control information calculated by the steering control information calculation unit 2 and the mark information processed by the mark information processing unit 4 on the same screen to be superimposed (step ST6).

Note that there is no existing steering control information when the device is started and thus step ST2 results in "NO". However, the steering control information calculation unit 2 instructs the adjustment information display unit 6 to display a graph of steering control information specified in advance ("NO" in step ST2 to "NO" in step ST4 to step ST6). Since no mark information is input when the device is started, step ST4 results in "NO" and thus the adjustment information display unit 6 displays only a graph of steering control information.

Figures 4A, 4B:
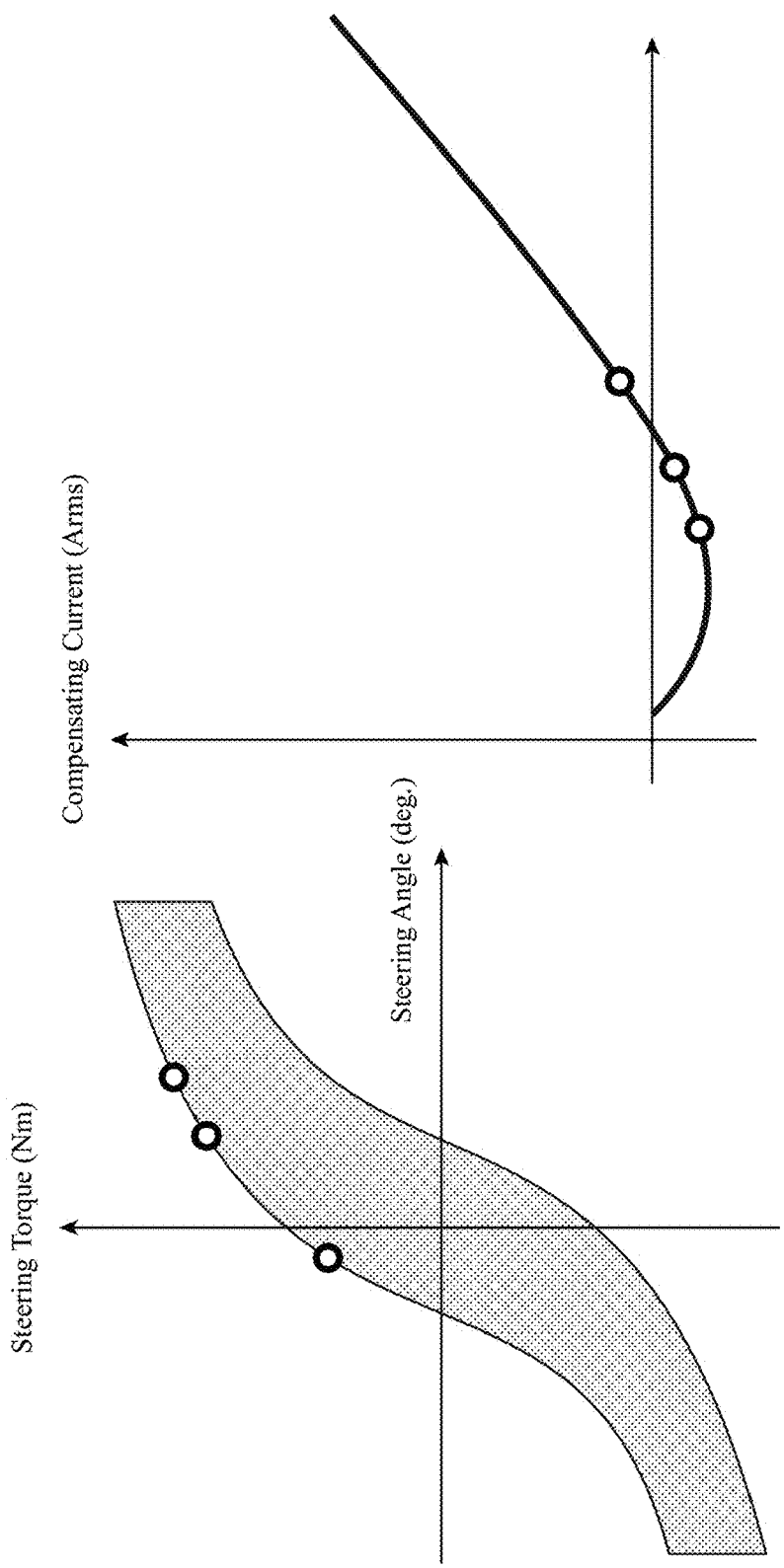
FIGS. 4A and 4B are explanatory diagrams illustrating exemplary display of the power steering adjustment device according to the first embodiment of the present invention.

FIGS. 4A and 4B are explanatory diagrams illustrating examples of display.

FIG. 4A illustrates relation between the steering angle and the steering torque. FIG. 4B illustrates relation between various parameters and the compensating current. As the various parameters to be indicated on the horizontal axis in FIG. 4B, parameters such as "reaction force received from a road surface" or "steering torque" may be included. As an integration of the relations between these various parameters and the compensating current, the graph representing the relation between the steering angle and the steering torque in FIG. 4A is calculated. In the example shown in FIGS. 4A and 4B, three pieces of mark information are input. The pieces of mark information are illustrated by small circles in FIGS. 4A and 4B. Each piece of the mark information corresponds to a value on the graph calculated by the steering control information calculation unit 2 at a point in time when the mark information is input by an adjusting person.

Moreover, the mark information may be displayed to make it possible to discriminate the order of input of each piece of the mark information to the mark information input unit 3. That is, the mark information processing unit 4 retains the order of each piece of mark information input from the mark information input unit 3, processes the mark information to enable display representing the order, and thereby outputs the mark information to the adjustment information display unit 6.

FIGS. 5A and 5B are diagrams illustrating an example where a piece of mark information acquired earlier is displayed in the back side of the screen while that acquired later is displayed in the front side of the screen.

Here, the mark information 501 is input first, the mark information 502 is input secondly, and the mark information 503 is input thirdly and thus is the latest.

Note that, other than the above, as a display for discriminating the input order of each piece of mark information, the number or the like corresponding to the order may be given to each piece of mark information, and the adjustment information display unit 6 displays the number together with each piece of the mark information.

Further, mark information may be displayed on a three-dimensional graph having the vehicle speed as one of the dimensions.

Figure 6:
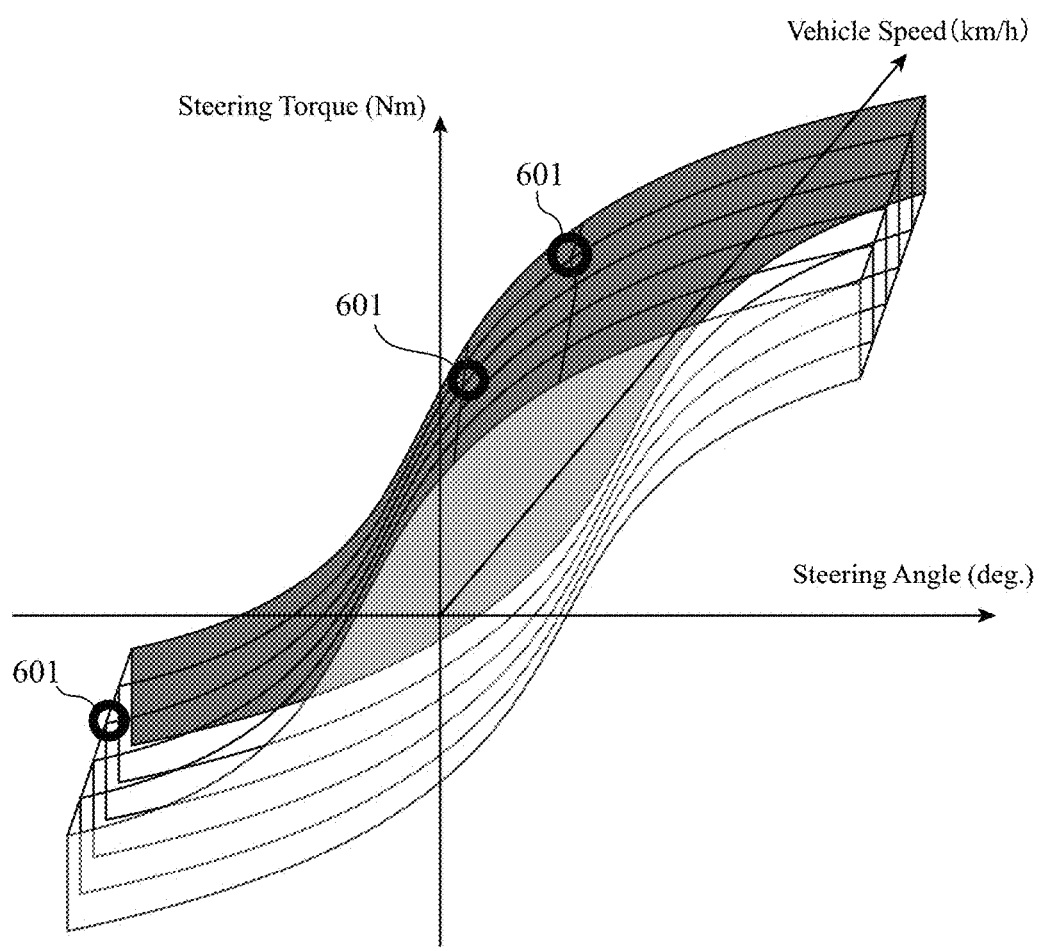
FIG. 6 is an explanatory diagram illustrating an example of a three-dimensional graph displayed by the power steering adjustment device according to the first embodiment of present the invention.

FIG. 6 is a diagram illustrating an example of displaying mark information 601 on a three-dimensional graph. This is an exemplary graph illustrating relation between the steering angle, the steering torque, and the vehicle speed. In this example, the steering control information calculation unit 2 outputs three-dimensional steering control information and the mark information processing unit 4 sets pieces of mark information 601 at corresponding places on the three-dimensional graph. As a result, when the vehicle speed is changed when mark information is input, the mark is displayed at a place of different vehicle speed on the graph.

As a result, a part where a change in the vehicle speed is not smooth, for example a part where "stuck feeling" of steering feeling is felt, which is a so-called a valley of vehicle speed can be easily found.

Note that, in the display examples described above, mark information is superimposed on a graph of steering control information. However, display may be performed without superimposing.

Input of mark information from the mark information input unit 3 may be input for deleting displayed mark information. For example, when an adjusting person performs deletion input of mark information displayed by the adjustment information display unit 6, the mark information processing unit 4 performs processing of deleting the latest mark information. As a result, every time when a deletion instruction of mark information is input from the mark information input unit 3, the deletion is performed from the latest mark information in turn. Therefore, for example, even when mark information is erroneously input, correction can be made promptly, and unintentionally deleting reliable mark information, which is input before the input of the latest mark information, can be prevented.

Note that, though the pieces of mark information are deleted one by one in the above, alternatively, the display of the whole mark information may be deleted at a time.

Next, storing and viewing of the adjustment information calculated by the adjustment information calculation unit 5 will be described.

In the flowchart in FIG. 2, when adjustment information is displayed by the adjustment information display unit 6, this data, that is, mark information and steering control information corresponding thereto are stored in the adjustment information storage unit 7 (step ST7). Regarding this stored data, for example, when operation for information viewing is performed such as an adjusting person performing predetermined operation on a touch panel (step ST8), the adjustment information calculation unit 5 performs processing for displaying the information of the stored data (step ST9).

That is, when operation for information viewing is performed, the adjustment information calculation unit 5 reads out related mark information and steering control information corresponding thereto from the adjustment information storage unit 7 as illustrated in FIG. 3 (step ST91). Thereafter, processing of the mark information is performed by the mark information processing unit 4 (step ST92) and a graph of steering control information is calculated by the steering control information calculation unit 2 (step ST93). Then, these data are provided to the adjustment information display unit 6 and display similar to that when the mark information is input is performed (step ST94).

Thereafter, the flow returns to step ST2 in FIG. 2 and input of new steering control information or new mark information is waited.

According to the above operation, the adjusting person can check later the state where mark information is input, and it is possible to perform adjustment work easily and comfortably.

As described above, a power steering adjustment device of the first embodiment includes: a steering control information acquisition unit acquiring steering control information representing control information of assist power of steering; a steering control information calculation unit calculating a graph of steering control information in accordance with the steering control information acquired by the steering control information acquisition unit; a mark information input unit acquiring mark information representing a point being an adjustment candidate of the steering control information; a mark information processing unit setting a mark in accordance with the graph of the steering control information when the mark information input unit acquires the mark information; and an adjustment information display unit displaying the graph of the steering control information and the mark being set by the mark information processing unit. Therefore, many workers are not required, and even when only one adjusting person is working, editing work can be performed easily and comfortably.

According to the power steering adjustment device of the first embodiment, the mark information processing unit sets the mark on the graph of the steering control information, and the adjustment information display unit displays the graph of the steering control information and the mark being set to be superimposed. As a result, an adjusting person can easily recognize relation between steering control information and mark information.

According to the power steering adjustment device of the first embodiment, the mark information processing unit performs setting of display of the mark information to discriminate an order of acquisition of each piece of the mark information. As a result, an adjusting person can easily recognize in what order the pieces of mark information are input.

According to the power steering adjustment device of the first embodiment, the mark information processing unit performs setting to display the mark information acquired earlier in the back while displaying that acquired later in the front. As a result, an adjusting person can easily recognize in what order the pieces of mark information are input.

According to the power steering adjustment device of the first embodiment, the mark information processing unit performs setting to display the number corresponding to an order of acquisition of a piece of the mark information. As a result, an adjusting person can easily recognize in what order the pieces of mark information are input.

According to the power steering adjustment device of the first embodiment, the mark information input unit accepts deletion input of display of the mark information, and the mark information processing unit performs setting to delete display of latest mark information when the deletion input is performed. Therefore, even when mark information is erroneously input, correction can be made promptly.

According to the power steering adjustment device of the first embodiment, the mark information input unit accepts deletion input of display of the mark information, and the mark information processing unit performs setting to delete whole of the mark information being displayed when the deletion input is performed. Therefore, when it is desired to newly set all pieces of mark information, existing pieces of mark information can be easily deleted.

According to the power steering adjustment device of the first embodiment, the graph of the steering control information is a three-dimensional graph having a vehicle speed as one of dimensions. As a result, an adjusting person can easily check a mark corresponding to the vehicle speed.

According to the power steering adjustment device of the first embodiment, an adjustment information storage unit storing the mark information set by the mark information processing unit is further provided. When the mark information stored in the adjustment information storage unit is read out, the steering control information calculation unit and the mark information processing unit provide: the graph of the steering control information corresponding to the mark information which is read out; and the mark information to the adjustment information display unit as display data. Therefore, even when only one adjusting person is working, editing work can be easily and comfortably performed after driving the vehicle.

Note that, the present invention may include a modification or omission of any component of respective embodiments within the scope of the present invention.

INDUSTRIAL APPLICABILITY

As described above, a power steering adjustment device according to the present invention relates to a configuration of adjustment support upon adjusting steering control of a vehicle and thus is suitable for use in adjustment of steering control when a vehicle is developed or a driver prefers to change steering characteristics.

REFERENCE SIGNS LIST

1: Steering control information acquisition unit, 2: Steering control information calculation unit, 3: Mark information input unit, 4: Mark information processing unit, 5: Adjustment information calculating unit, 6: Adjustment information display unit, 7: Adjustment information storage unit

The invention claimed is:

1. A power steering adjustment device comprising:
    a steering control information acquirer acquiring steering control information representing control information of assist power of steering;
    a steering control information calculator calculating a graph of steering control information in accordance with the steering control information acquired by the steering control information acquirer;
    a mark information inputter acquiring mark information representing a point being an adjustment candidate of the steering control information;
    a mark information processor setting a mark in accordance with the graph of the steering control information when the mark information inputter acquires the mark information; and
    an adjustment information display displaying the graph of the steering control information and the mark being set by the mark information processor.

2. The power steering adjustment device according to claim 1,
    wherein the mark information processor sets the mark on the graph of the steering control information, and
    the adjustment information display displays the graph of the steering control information and the mark being set to be superimposed.

3. The power steering adjustment device according to claim 1,
    wherein the mark information processor performs setting of display of the mark information to discriminate an order of acquisition of each piece of the mark information.

4. The power steering adjustment device according to claim 3,
    wherein the mark information processor performs setting to display the mark information acquired earlier in the back while displaying that acquired later in the front.

5. The power steering adjustment device according to claim 3,
    wherein the mark information processor performs setting to display the number corresponding to an order of acquisition of a piece of the mark information.

6. The power steering adjustment device according to claim 1,
    wherein the mark information inputter accepts deletion input of display of the mark information, and
    the mark information processor performs setting to delete display of latest mark information when the deletion input is performed.

7. The power steering adjustment device according to claim 1,
    wherein the mark information inputter accepts deletion input of display of the mark information, and
    the mark information processor performs setting to delete whole of the mark information being displayed when the deletion input is performed.

8. The power steering adjustment device according to claim 1,
    wherein the graph of the steering control information is a three-dimensional graph having a vehicle speed as one of dimensions.

9. The power steering adjustment device according to claim 1, further comprising:
    an adjustment information storage storing the mark information set by the mark information processor,
    wherein, when the mark information stored in the adjustment information storage is read out, the steering control information calculator and the mark information processor provide: the graph of the steering control information corresponding to the mark information which is read out; and the mark information to the adjustment information display as display data.

* * * * *